United States Patent
Braune et al.

(10) Patent No.: US 10,726,538 B2
(45) Date of Patent: Jul. 28, 2020

(54) METHOD OF SECURING A HAZARD ZONE

(71) Applicant: SICK AG, Waldkirch (DE)

(72) Inventors: Ingolf Braune, Waldkirch (DE); Armin Hornung, Waldkirch (DE); Matthias Neubauer, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/420,703

(22) Filed: May 23, 2019

(65) Prior Publication Data
US 2019/0378264 A1     Dec. 12, 2019

(30) Foreign Application Priority Data
Jun. 7, 2018    (EP) ..................... 18176457

(51) Int. Cl.
*G06T 7/00*       (2017.01)
*G06K 9/00*       (2006.01)
(Continued)

(52) U.S. Cl.
CPC .......... *G06T 7/0004* (2013.01); *G05B 19/048* (2013.01); *G06K 9/00771* (2013.01);
(Continued)

(58) Field of Classification Search
CPC ....... G06T 7/0004; G06T 7/593; G06T 7/001; G06T 2207/10012; G06T 2207/10028; G06T 2207/30232; H04N 13/207; H04N 13/243; H04N 5/2256; H04N 2005/2255; G05B 19/048; G05B 2219/24024; G06K 9/00771; G08B 21/18; H02H 7/222; H05B 33/0854; H05B 37/0281
See application file for complete search history.

(56) References Cited

U.S. PATENT DOCUMENTS

| | | | |
|---|---|---|---|
| 2007/0194944 A1* | 8/2007 | Galera ...................... | F16P 3/14 340/686.6 |
| 2016/0040827 A1* | 2/2016 | Merx ...................... | F16P 3/142 700/79 |
| 2019/0370552 A1* | 12/2019 | Nater ...................... | G06T 7/215 |

FOREIGN PATENT DOCUMENTS

| | | |
|---|---|---|
| DE | 102005054359 A1 | 5/2007 |
| DE | 102007014612 A1 | 9/2008 |

(Continued)

OTHER PUBLICATIONS

ELKmann, Norbert et al. "Arbeitssystem der ZukunFT-Mensch-Roboter Arbeitsplatz, Produktion and Logistik mit Zukunft: Digital Engineering and operation", Herausgeber Univ. Dec. 15, 2015. Berlin, Heidelberg, Germany, p. 55-59 with English Abstract.

(Continued)

*Primary Examiner* — Alexander Gee (74) *Attorney, Agent, or Firm* — Nath, Goldberg & Meyer; Jerald L. Meyer (57) ABSTRACT

A method of securing at least one hazard zone comprising a hazardous machine is provided, wherein objects are detected in an environment of the hazard zone from measured data of at least one 3D sensor, and wherein a safety directed reaction of the machine takes place on an impending danger. A switch is made to at least one new hazard zone to be activated during the operation of the machine and a check is made whether the new hazard zone to be secured is free of objects.

11 Claims, 4 Drawing Sheets

(51) Int. Cl.
*G05B 19/048* (2006.01)
*H04N 13/207* (2018.01)
*G06T 7/593* (2017.01)
*H04N 13/243* (2018.01)
*G05B 19/4061* (2006.01)
*B25J 9/16* (2006.01)

(52) U.S. Cl.
CPC ........... *G06T 7/593* (2017.01); *H04N 13/207* (2018.05); *G05B 2219/24024* (2013.01); *G06K 2209/19* (2013.01); *G06T 2207/10012* (2013.01); *G06T 2207/10028* (2013.01); *G06T 2207/30232* (2013.01); *H04N 13/243* (2018.05)

(56) References Cited

FOREIGN PATENT DOCUMENTS

| | | |
|---|---|---|
| EP | 1635107 B1 | 2/2007 |
| EP | 2023160 A1 | 2/2009 |
| EP | 2315052 B1 | 2/2012 |
| EP | 2395274 B1 | 4/2015 |
| EP | 3200122 A1 | 8/2017 |
| EP | 3217195 A1 | 9/2017 |
| WO | 2015177188 A1 | 11/2015 |

OTHER PUBLICATIONS

Miseikis, Justinas, et al."Multi 3d Camera Mapping for Predictive and Reflexive Robot Manipulator Trajectory Estimation"; 2016 IEEE Symposium Series on Computational Intelligence (SSCI).
European Search Report dated Nov. 26, 2018 corresponding to application No. 18176457.2-1205.

* cited by examiner

METHOD OF SECURING A HAZARD ZONE

FIELD

The invention relates to a method of securing at least one hazard zone comprising a hazardous machine, wherein objects are detected in an environment of the hazard zone from measured data of at least one 3D sensor, and wherein a safety directed reaction of the machine takes place on an impending danger. The invention further relates to a 3D sensor for monitoring an environment of at least one hazard zone comprising a hazardous machine, wherein the 3D sensor has at least one image sensor for detecting three-dimensional image data and a control and evaluation unit that is configured to detect objects in the environment with reference to the three-dimensional image data.

BACKGROUND

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable securing measure is taken.

3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard EN13849 for safety of machinery and the machinery standard IEC61496 or EN61496 for electrosensitive protective equipment (ESPE). To satisfy these safety standards, a series of measures have to be taken such as a secure electronic evaluation by redundant, diverse electronics, functional monitoring or especially monitoring the contamination of optical components.

The common securing concept provides that protected fields are configured that may not be entered by operators during the operation of the machine. If the sensor recognizes an unauthorized intrusion into the protected field, for instance a leg of an operator, it triggers a safety-directed stop of the machine. In some cases, additional warning fields are positioned in front of the protected fields to prevent a person from a protected field infringement in good time or to reduce the working speed of the machine as a precaution. Protected fields have to be configured as relatively large to satisfy all conceivable cases so that a system reaction that reduces productivity occurs at a comparatively early time.

Protected fields in addition do not permit any close cooperation with machines, in particular with robots (HRC, human robot collaboration). Relevant standards in this connection are, for example, ISO 10218 for industrial robots or ISO 15066 for collaborative robots. Safety distances should be configured as small as possible in HRC and possibly even in a situation adapted manner, naturally with the proviso that safety is maintained. Standards ISO 13854, ISO 13855, and ISO 13857 deal with the establishment of safety distances.

An evaluation of objects and machines with respect to speed and to mutual distance is called "speed and separation monitoring" in said robot standards. It is expediently not the distance from the machine itself that is measured here. This would be too complex and too dynamic and a sufficient safe distance from future machine positions should also be observed. It is therefore sensible to predefine a hazard zone that surrounds the machine, that is a spatial region or a volume within which the machine carries out work movements. A hazard zone around all machine positions that the machine reaches in its work routine as a rule, however, has to be configured as so large that close cooperation between a human and a robot is still not possible.

DE 10 2005 054 359 A1 discloses a safeguard for a vehicle having an optical sensor. The direction of travel and the speed are determined by locating objects by means of the optical sensor and one protected field is selected from a plurality of stored protective fields in dependence on these parameters. At least two hazard zones for a harvester are defined in WO 2015/177 188 A1 among which one is selected in dependence on travel parameters.

In DE 10 2007 014 612 A1 hazard zones at a power-operated textile machine are monitored. A dynamically spatially variable protected zone can be formed by a select activation of spatially fixed monitoring means.

EP 1 635 107 B1 uses parameters supplied from a machine control for the fixing of a protected field called a danger zone.

In EP 2 315 052 B1 a specific hazardous object is recognized with reference to its geometry or to its movement behavior. Protected fields are then adapted to the movement of this hazardous object or a switchover is made between a plurality of protected field configurations.

EP 2 395 274 B1 fixes safety zones in dependence on the movement behavior of an object in an operating zone.

Said documents thus pursue various approaches to dynamically adapt protected fields; however, the general disadvantages of protected fields cannot be overcome by them and are also not even addressed.

EP 3 200 122 A1 discloses a 3D sensor with a safe recognition of objects in which the depth map is evaluated by a fine and by a coarse detection capability. Finely detected objects within an environment of a coarsely detected object are assigned to it, isolated finely detected objects are ignored as interference. This makes it possible to filter small objects determined downstream as not safety relevant, but otherwise does not contribute to advancing the securing of hazard zones.

SUMMARY

It is therefore the object of the invention to improve the securing of a hazard zone by a 3D sensor.

This object is satisfied by a method of securing at least one hazard zone comprising a hazardous machine and by at least one 3D sensor for monitoring an environment of at least one hazard zone in accordance with the respective independent claim. A hazard zone is a spatial region that secures at least one machine so that no-one is injured by the machine. Persons may accordingly not be there because otherwise an accident occurs. The machine is here preferably at least partly in the hazard zone. A hazard zone may not be confused with a protected field that is namely situated in front of the hazard zone to prevent an approach of persons to the hazard zone. Unlike the hazard zone, a protected field is as a general rule free of all kinds of moving machine parts.

In operation, a 3D sensor monitors the environment of the hazard zone so that no-one is injured by the machine. The detected objects are evaluated with respect to the hazard zone. If a dangerous situation is accordingly present, a safety directed reaction of the machine is triggered. At least the final classification of whether this is necessary is preferably not made by the 3D sensor itself, but rather by a control connected thereto based on the objects detected by the 3D sensor or on values derived therefrom.

The invention starts from the basic idea of following the work routine of the machine by switching over between hazard zones. The work routine of the machine also comprises the cooperation of a plurality of machines, for instance in that a machine interrupts its work and another machine continues the work routine. To safely activate the respective new hazard zones to be secured here, a check is made whether they are free of objects. As will be discussed below, relevant documents are meant by this, which does not have to coincide with all the objects detected at all. There are not yet any hazardous machine parts in the respective new hazard zones to be secured because they only move there for the next workstep. This is in turn only permitted when no danger is thereby triggered, that is when the check has shown that the new hazard zone to be secured is free of objects. There can be a plurality of hazard zones to secure different machine parts or an environment thereof or a plurality of machines.

The invention has the advantage that by dispensing with the conventional protected fields oriented on worst-case scenarios, a securing is made possible that is closely adapted to the respective workstep. Hazard zones can already be modeled in advance in a configuration, for example assembled from simple geometrical bodies. Only the hazard zones currently required in the process routine are respectively activated during the running time and a dynamic reaction in accordance with the current hazard is thus made possible. This increases productivity in a variety of respects. Only a minimal sealing of production areas for safety demands is required. The distance of the worker from the hazard zone is also optimized and a closer cooperation with the machine is made possible by the reduced area use. Unnecessary emergency stops of the machine are prevented.

At the same time, the communication effort between the 3D sensor and the machine control or a further control connected therebetween is small. In operation, only activation commands for the prepared hazard zones have to be transmitted, but by no means complex 3D geometries of the hazard zones and no continuous exchange of machine positions is required either. Previously conventional safe fieldbus protocols can therefore be used for communication.

The 3D sensor is preferably a 3D camera that can initially be any know technique such as a time of flight principle with a direct time of flight measurement of light signals or a phase measurement or a distance estimate from brightness levels or focal positions (DFF depth from focus; DFD, depth from defocus). The 3D camera particularly preferably uses a triangulation principle, however, in which two camera images of a moving camera or of a stereo camera are correlated with one another or alternatively an illumination pattern is correlated with a camera image to thus estimate disparities and to determine distances therefrom. A laser scanner is also a 3D sensor since it produces 3D point clouds that are limited to one scanning plane with a classical laser scanner. This restriction with a laser scanner is lifted by a scan moving in elevation or by a plurality of scanning beams set into elevation. The field of vision can be expanded by the user of a plurality of 3D sensor or the perspectives of the 3D sensors complement one another. Hybrid arrangements having different 3D sensors or other sensors such as a light grid are likewise conceivable.

The 3D sensor is preferably configured for a detection capability in which objects are safely detected from a minimum size onward. The detection capability is a specified suitability of a sensor that is safe in the sense of the standards named in the introduction or comparable standards to safely detect objects of a minimum size in the total monitored zone. The corresponding configuration of the 3D sensor relates to its design, that is to its optics, its light receiver, and further possible components, not yet named, such as lighting, and to the secure evaluation. The detection capability in the first instance does not preclude smaller objects from also being detected. However, protection is not guaranteed for objects that are smaller than the minimum size; for example, a finger is not reliably detected with a 3D sensor designed for arm protection. Objects smaller than the minimum size are therefore possibly excluded in the evaluation by means of filtering. It is also possible to select a minimum size above the detection capability, that is not to utilize a resolution provided per se. Numerical examples can be given as 14 mm for finger protection or in the range from 30-80 mm for the protection of extremities, in particular 55 mm for upper arm protection.

The 3D sensor preferably determines the shortest distance between the hazard zone and objects and outputs it to a control that decides whether a safety directed reaction of the machine takes place in dependence on the shortest distance. The 3D sensor here not only automatically recognizes objects in the environment of the hazard zone, but rather also determines distances of the recognized objects from the hazard zone. Since all the hazard zones are already known at the configuration time, possibilities result likewise already to calculate parts of the distance calculation at the configuration time.

If a plurality of hazard zones are active, the shortest distance from an object detected by the 3D sensor is preferably determined for each hazard zone. Detection data are suitably merged in a 3D sensor association having a plurality of 3D sensors. This can in particular only take place at the level of shortest distances; each 3D sensor then works largely autonomously up to a very late processing stage. Alternatively, the measured data can also already be combined and evaluated together.

Only the shortest distances are preferably provided by the 3D sensor over a safe output interface and the further evaluation of whether a hazard is impending takes place on this basis in a connected control. The control is higher ranking than the 3D sensor and than the monitored machine or the monitored machines or it is the control of the machine itself. The control evaluates the distances delivered by the 3D sensor and initiates a safety-directed response where necessary. Examples for a reaction are an emergency stop, a braking, an evading, or a putting into a safe position. It is conceivable to specify a fixed minimum distance that is, for instance, determined under worst case assumptions for speeds or from known or measure trailing distances. Dynamic safety distances, inter alia in dependence on the current speed of the machine and of the object, are also conceivable. Data of the control of the machine can enter into the safety evaluation. Additional information can be output with the shortest distance such as the speed of the next object and can enter into the safety assessment.

A safe output interface is also conventionally provided, but is only used to output a binary signal of whether a protected field infringement is present (OSSD output signal switching device). In preferred embodiments with an output of a shortest distance from the hazard zone, protected fields are no longer monitored and binary securing signals are also no longer generated and output by the 3D sensor itself. Instead, the information required for this is provided in a safe, very compact, and easily accessible manner. The respectively current shortest distance is provided instead of the previously customary binary securing signal at the safe output interface, that is consequently no longer designed as an OSSD, for a connected control. This control, for instance the higher ranking control of a robot cell or also the control of the robot itself can very simply determine with respect to the shortest distance whether there is a hazard and takes over the actual securing function itself.

In this respect, work or the cooperation with machines becomes substantially more flexible in design and a fast, individual response to humans in the environment of the machine is made possible. An intrusion into a protected field as a rule only allows an emergency stop since protected fields are defined exactly such that in such a case there is a risk of an accident that is no longer differentiated due to the binary shutdown signal. However, milder intrusions in the process routine that avoid a time-intensive emergency stop together with a restart and that allow the process routine to continue to run without interference where possible or that integrate the approach of a human into the process routine are also possible by monitoring shortest distances. Worksteps of the machine can be replanned in good time here.

At least one previous hazard zone to be secured is preferably deactivated on the switchover. The switchover to a new hazard zone to be secured means that this hazard zone is activated and is checked for freedom from objects in so doing. It is admittedly possible that only active hazard zones are added on a switchover procedure. Switching over, however, preferably means that now other hazard zones are secured at least in part; accordingly at least one of the previous hazard zones is deactivated, preferably as the last step of the switchover after the new hazard zones to be secured are active. In contrast to the activation, nothing further has to be considered on deactivation. No safety critical objects can thus be overlooked since the spatial region of the deactivated hazard zone is immediately monitored as an environment of the remaining active hazard zones. The activation should admittedly be suitable for the work process, that is moving machine parts should no longer be present in the deactivated hazard zone. If this does not apply, safety is, however, not impaired, but only availability since the moving machine part possibly comes too close to a still active hazard zone and thereby a safety reaction is triggered that is unnecessary per se.

Objects in the hazard zone itself are preferably ignored on the detection of objects by the 3D sensor. The hazard zone itself is therefore considered as free of objects to be detected or rather as blocked by the machine. In fact, there would still be space for additional objects in the hazard zone depending on the configuration. The machine naturally also itself forms an object that is first detected by the 3D sensor. All that is, however, intentionally ignored and the hazard zone is masked or is modeled as an empty block free of objects. This simplifies the monitoring and the determination of shortest distances since the dynamics of the machine within the hazard area thus do not play any role. This is also unproblematic from a safety engineering aspect since each object is recognized in good time when it approaches the hazard area. If, however, the inner space of a hazard zone is not further monitored, it is all the more important to previously check the freedom from objects on an activation of hazard zones.

Objects in a projective masked region of the hazard zone from a central perspective of the 3D sensor are preferably also ignored. The hazard zone is projectively expanded. This relates to the projective shadow region that is behind the hazard zone from the view of the 3D sensor, but also to a masked region on the facing side between the 3D sensor and the hazard zone. If namely the hazard zone is advantageously masked by technical calculation in the sense that sight rays in the hazard zone are ignored in total, the 3D sensor is also blind in the masked region. Through a suitable configuration of hazard zones, namely such that their outer surfaces are visible to at least one 3D sensor, shortest distances can nevertheless be added to the hazard zone itself, but not to its projective extension, whereby the distances are not unnecessarily underestimated at the cost of availability.

The check whether the new hazard zone to be secured is free of objects preferably does not extend to an overlap region with previously secured hazard zones. The respective zone to be checked thereby becomes smaller; effort is saved accordingly. It is sufficient to restrict the check of freedom from objects to the region exclusively taken up by the new hazard zones. The previously active hazard zones were constantly monitored; no object can be in or can even have penetrated into a dangerous proximity.

The check whether the new hazard zone to be secured is free from objects preferably includes a safety buffer around the new hazard zone to be secured that is determined from a required switchover time and a maximally adopted object speed. The region that is checked for freedom from objects for the new hazard zone to be secured is therefore expanded with respect to the actual new hazard zone to be secured by a tolerance that takes account of the required switchover time and the maximum object speed. It is thus prevented that an object penetrates unnoticed into the new hazard zone to be secured between the check for freedom from objects and its actually started monitoring.

At least two configuration sets of hazard zones are preferably specified for worksteps of the machine and a switchover is made one after the other to the hazard zones of the associated configuration set for the respective next workstep to be carried out. The worksteps of the machine are secured with different hazard zones and these hazard zones are suitably fixed in advance and are then sequentially switched through in operation to monitor the process.

An activation request is preferably first made to the 3D sensor for the switching over of hazard zones that then checks whether the new hazard zones to be secured is free of objects and reports this back, whereupon the switchover only takes place with a free new hazard zone to be secured. Such an activation sequence with a preliminary enquiry and confirmation is above all advantageous for a sensor association having a plurality of 3D sensors in which the switchover may only take place when all the involved 3D sensor agree. Otherwise the 3D sensors would be in disagreement as to which hazard zones are active in an undefined intermediate state. In the activation sequence with a preliminary enquiry, no actual switchover takes place for so long as at least one 3D sensor reports an object in the region of the new hazard zones to be secured. The switchover has to be refused for so long or the request for a switchover has to be repeated. This can be associated with a warning that, for example, prompts a worker to leave a new hazard zone to be secured.

If the new hazard zone to be secured is not free of objects, an alternative next workstep of the machine with other hazard zones to be secured preferably follows. This is an alternative to waiting until the new hazard zone to be secured is free of objects. The machine tries an alternative workstep in which the object that prevents the switchover to the initially desired new hazard zones to be secured is no longer disruptive. For example, the machine tries a different path into a new position for the next workstep or it continues work at the old location until the path to the new location has become free.

The 3D sensor in accordance with the invention for monitoring an environment of at least one hazard zone has at least one image sensor for detecting three-dimensional image data and a control and evaluation unit that is configured to detect objects in the environment with reference to the three-dimensional image data. Various embodiments of 3D sensors already named above are conceivable here. At least two configuration sets of hazard zones are stored in a memory of the 3D sensor and the control and evaluation unit is configured to switch over between the hazard zones and for this purpose to check whether a new hazard zone to be secured is free of objects. The securing and the switchover preferably take place in accordance with one of the described embodiments of the method in accordance with the invention. The control and evaluation unit is preferably configured to check in response to a switchover request whether a new hazard zone to be secured is free of objects and thereupon to generate a feedback whether the switchover is currently possible. The 3D sensor is thereby able to follow an activation sequence on the switchover in which a switchover request is first confirmed after a successful check for freedom from objects and a switchover is then actually made. A plurality of 3D sensors can thus be coordinated in a sensor association.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
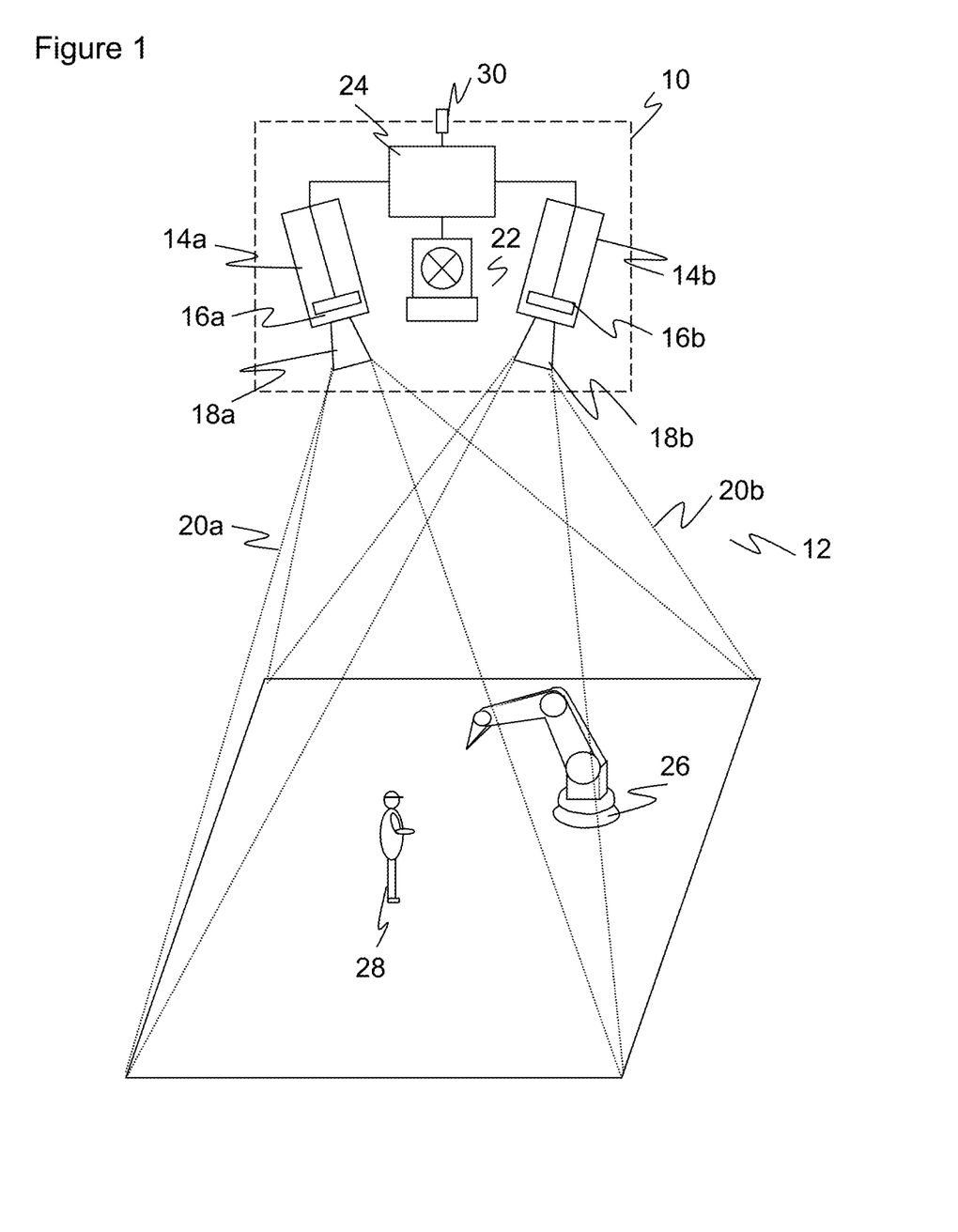
FIG. 1 a schematic three-dimensional representation of a 3D camera and its monitored zone.

FIG. 1 shows in a schematic three-dimensional representation the general design of a stereo camera for recording a depth map as an example of a 3D sensor 10 in accordance with the invention for which the detection of 3D image data will be explained. Different 3D cameras with detection principles such as a correlation of image and projected illumination patterns or determination of the time of flight and laser scanners would equally be conceivable as the 3D sensor 10.

To detect the spatial region 12, two camera modules 14a, 14b are mounted at a known fixed distance from one another therein and each take images of a spatial region 12. An image sensor 16a, 16b, usually a matrix-type imaging chip, is provided in each camera and records a rectangular pixel image, for example a CCD or a CMOS sensor. The two image sensors 16a, 16b together form a 3D image sensor for detecting a depth map. One objective 18a, 18b having an optical imaging system is associated with each of the image sensors 16a, 16b respectively which in practice can be realized as any known imaging objective. The maximum angle of view of these optics is shown in FIG. 1 by dashed lines which each form a pyramid of view 20a, 20b.

An illumination unit 22 is provided between the two image sensors 16a, 16b to illuminate the spatial region 12 with a structured pattern. The stereo camera shown is accordingly configured for active stereoscopy in which the pattern also imparts evaluable contrasts everywhere to scenery that is structure-less per se. Alternatively, no illumination or a homogeneous illumination is provided to evaluate the natural object structures in the spatial region 12, which as a rule, however, results in additional aberrations.

An evaluation and control unit 24 is connected to the two image sensors 16a, 16b and the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can be distributed over any desired internal and external components, with external components also being able to be integrated via a network or cloud provided that latencies can be managed or tolerated. Since the generation of the depth map and its evaluation is very processing intensive, an at least partly parallel architecture is preferably formed.

The control and evaluation unit 24 generates the structured illumination pattern with the aid of the illumination unit 22 and receives image data of the image sensors 16a, 16b. It calculates the 3D image data or the depth map of the spatial region 12 from these image data with the aid of a stereoscopic disparity estimate. The total detectable spatial region 12 or also the working region can be restricted via a configuration, for example to mask interfering or unnecessary regions.

An important safety engineering application of the 3D sensor 10 is the monitoring of a machine 26 that is symbolized by a robot in FIG. 1. The machine 26 can also be substantially more complex than shown, can consist of a number of parts, or can actually be an arrangement of a plurality of machines, for instance of a plurality of robots or robot arms. The 3D sensor 10 is preferably configured in a failsafe manner for the safe detection of an object in the protection of persons in the sense of safety standards such as named in the introduction, in particular in accordance with IEC 61496-4-3.

The depth map is preferably first subjected to some pre-processing steps, for example a cutting out of the known background, in the control and evaluation unit 24 for the evaluation of where an object 28 shown as a person is located with respect to the machine 26. A recognition of the objects 28 in the spatial region 12 is then carried out, with demands being able to be made on relative objects 28, for instance a minimum size corresponding to a demanded detection capability. Filters using a body model for more robustness are also conceivable, for instance in the manner such that, as in EP 3 200 122 A1, finely detected objects are only relevant if they are located close to a coarsely detected object.

The shortest distance of the machine 26 from the next object is subsequently calculated among the remaining objects 28. In the distance calculation, the projective shadow of the object 28 is preferably taken into account, for example in that the shaded region is assumed as occupied by an object as a precaution. It is thus prevented that a safety relevant object 28 is overlooked in a shadow region not visible from the central perspective of the 3D sensor 10. The respective current shortest distance is provided to a safe interface 30 cyclically or acyclically. Typical output rates are multiple times a second; however, a more infrequent updating is also conceivable depending on the required and possible response time of the 3D sensor 10.

A higher ranking control connected to the safe interface 30 in particular that of the machine 26, evaluates the shortest distance for satisfying a safety function, for example a speed and separation monitoring in accordance with ISO/TS 15066 and for this purpose compares the shortest distance with a required safety distance, for instance in accordance with ISO 13855. The next workstep of the machine 26 is then replanned as required in dependence on the shortest distance or, in the hazard case, a safety directed reaction is initiated, for example to stop or brake the machine 26 or to cause it to evade, so that the required safety distance between man and machine is continuously maintained. The reaction can, in addition to the shortest distance, depend on further conditions such as the speeds or the nature of the object 28 and the machine region 26 of the impending collision.

According to the previous explanation, the machine 26 itself is observed and the shortest distance from it is determined. However, in practice, this is not done due to the design and dynamics that may be very complex under certain circumstances. The machine 26 is instead modeled as so-called hazard zones in accordance with the invention.

Figure 2:
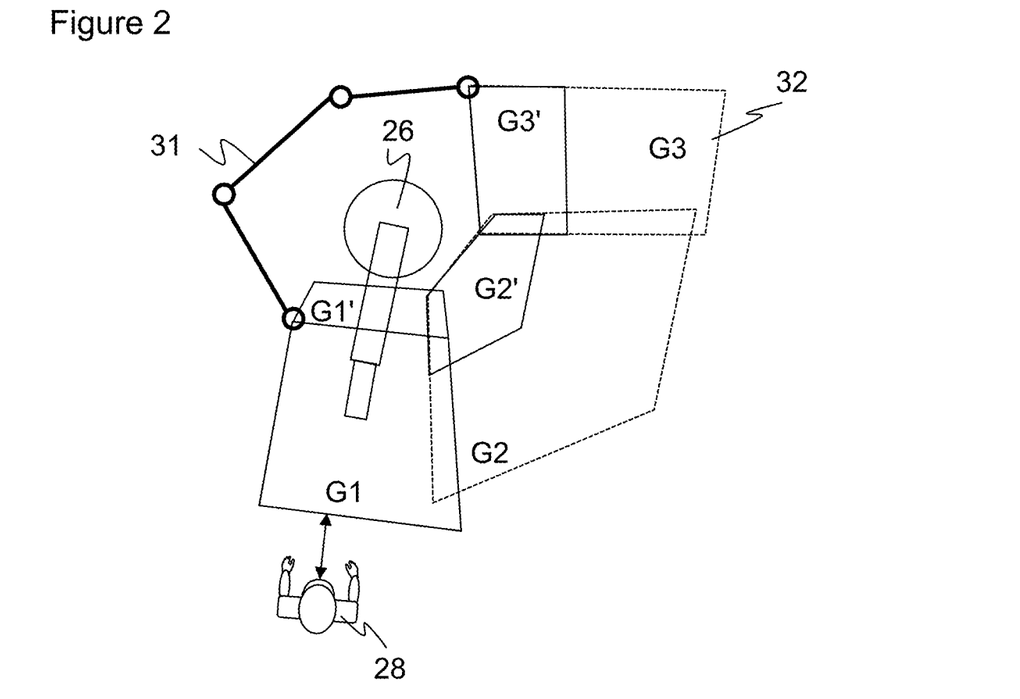
FIG. 2 a schematic plan view of a monitored scene with a plurality of hazard zones.

FIG. 2 in this respect very schematically shows an exemplary scene in a plan view. The monitoring 3D sensor 10 is not shown that can in another respect also be a sensor association having a plurality of 3D sensors 10 and/or other sensors to expand the field of vision and/or to acquire additional perspectives. A rear region of the machine 26 is not visible to the 3D sensor 10, at least not from a suitable perspective and is therefore secured in another manner. A physical barrier 31 is shown; an alternative securing by light grids or other sensors is equally conceivable.

A plurality of hazard zones 32 that are marked by G1, G1', G2, G2', G3, and G3' are configured by way of example around the machine 26 or in the access region not secured by the physical barrier 31. FIG. 2 only shows a projection, in fact the hazard zones 32 are volumes or spatial regions in which the machine 26 carries out work movements in a respective time period. The hazard zones 32 can surround the machine 26 at a little distance to leave sufficient clearance for the work movements. In addition, it is advantageous for the calculations to define geometrically simple hazard zones 32, for which purpose certain empty spaces can then be accepted. In the example of FIG. 2, for instance, the polygonal chains shown can be drawn with perpendicular outer surfaces upward. The specific geometry of a hazard zone 32 is not restricted to these examples. Hazard zones 32 should be configured such that the 3D sensor or the sensor association can actually safely monitor them, but the conditions and configuration options required therefor are not the subject matter of this application. As also in FIG. 2, a plurality of hazard sites 32 surround, as required, a plurality of machines 26 and/or a plurality of movable part sections of a machine 26.

A hazard zone 32 itself is preferably considered free of objects 28 to be detected or rather as blocked by the machine 26. In fact, depending on the bounding box that models the machine 26 as a hazard zone 32, there would easily be space for objects 28 therein. The machine naturally also itself forms an object 28 that is first detected by the 3D sensor 10. The distinguishing between the machine 26 and the object 28 within the hazard zone 32 would, however, be extremely difficult and susceptible to error with the result that the distance of the machine 26 from itself is calculated and an unnecessary safety reaction thereupon takes place. The dynamics of the machine 26 within the hazard zone 32 do not play any role since the hazard zone 32 together with the projective masked regions and shadow regions is preferably already masked for the object recognition. This is unproblematic from a safety engineering aspect since each object 28 is recognized in good time when it approaches the hazard zone 32. The masking only relates to hazard zones 32 that are at least partly in the field of view of the 3D sensor 10. Hazard zones 32 outside the field of view are not looked at any further here.

In principle, it would already safe to define a single large hazard zone 32 rigidly while including all conceivable work movements. This would, however, take up large areas and would hamper productivity. Provision is therefore made In accordance with the invention to switch over hazard zones 32. Respective hazard zones 32 are defined for part sections of the work movement that are utilized in a sequence corresponding to the process and that are smaller and are better adapted. A substantially closer cooperation is thereby made possible since a worker can currently enter inactive hazard zones 32, their areas are not sealed over the total operation of the machine 26. On the switchover of a sequence of hazard zones 32 that follows a process of the machine 26, however, precautions have to be taken not to overlook any objects 28, and this will now be explained.

The switchover of hazard zones 32 can be divided into three steps in a preferred embodiment:

First, the process routine of the machine 26 is divided into worksteps and where possible only the minimally required hazard zones 32 corresponding to the movement paths and sequences are defined around the working regions of the machine 26 and the connection paths for the worksteps. This is done, for example, by the configuring person in a configuration tool by importing from a control of the plant, in particular of a robot that, for example, transmits its work spaces or by a combination in which an import is postprocessed. The configurations of the hazard zones 32 are preferably stored in the 3D sensor 10 so that they do not have to be transmitted at the running time.

Second, a schedule is prepared that includes programming in which process step which hazard zones 32 are active or inactive. In operation, this schedule is carried out such that respective hazard zones 32 are activated in accordance with the schedule. Alternatively, the schedule is not fixed as a whole, but rather a switchover to the hazard zone configuration dynamically takes place for a subsequent workstep. The order of the worksteps is then not fixed. On the switchover of hazard zones 32, in particular on the activation of new hazard zones 32 last not monitored, a check is made whether objects 28 could hide in the region masked by the new hazard zone 32.

Third, the object detection of the 3D sensor determines as already mentioned the distance of the respective next object 28 from the currently active hazard zones 32 during operation. With a plurality of active hazard zones 32, a plurality of distances are determined in parallel. An assessment is made on the basis of the shortest distances whether a safety directed reaction has to be initiated.

An insertion task can be thought of as an example to illustrate the initial fixing of hazard zones 32 for the respective worksteps. Manual activities of the worker can be carried out in regions to be used alternately by human and machine in that the total work region is not permanently blocked, but rather only the respective region required for a workstep is blocked by active hazard zones 32. For example, a new set of installation parts can be introduced into the receiving station during an installation procedure of a robot. Accordingly, hazard zones 32, in particular of different sizes, are defined for the installation region, for the receiving station, and for the connection paths to be used alternately later in operation. A dynamism in the process is thus mapped via the activation and deactivation of statically configured hazard zones.

The machine 26 is a robot in the example of FIG. 2. The hazard zones 32 marked by G1, G2, G3 secure its moving axles, while the hazard zones marked by G1', G2' and G3' prevent access to the robot. The hazard zones G1 and G3 represent two work stations. As long as, as shown, the robot works in hazard zone G1 in the first work station, the hazard zones G1, G2', and G3' marked by solid lines are active. Accordingly, the shortest distance, symbolized by an arrow, of the person 28 from the next active hazard zone G1 would also be calculated. The movement of the robot into the second work station and the work there in hazard zone G3 are provided as two further exemplary worksteps. The hazard zones G2 and G3 should be activated in addition to the already activated hazard zone 1 to secure the transition. Once the robot has reached hazard zone G3, only hazard zones G', G2' and G3 are active. A distance limit value for the distance from active hazard zones 32 may not be fallen below at any point in time for safe operation, which applies in a parallel manner for all the active hazard zones 32. The distance limit value is not necessarily constant, but rather possibly depends on values such as the speed of a detected object 28 or also of the machine 26 or its specific workstep.

In operation, hazard zones 32 are then activated and deactivated in accordance with the schedule matching the respective worksteps of the machine 26. Since the inner region of a hazard zone 32 is masked and thus not monitored, a check must be made before the activation of a hazard zone 32 of whether its region is free of objects 28. Otherwise an object 28 could disappear unseen in the hazard zone 32 after the switchover.

Figure 3:
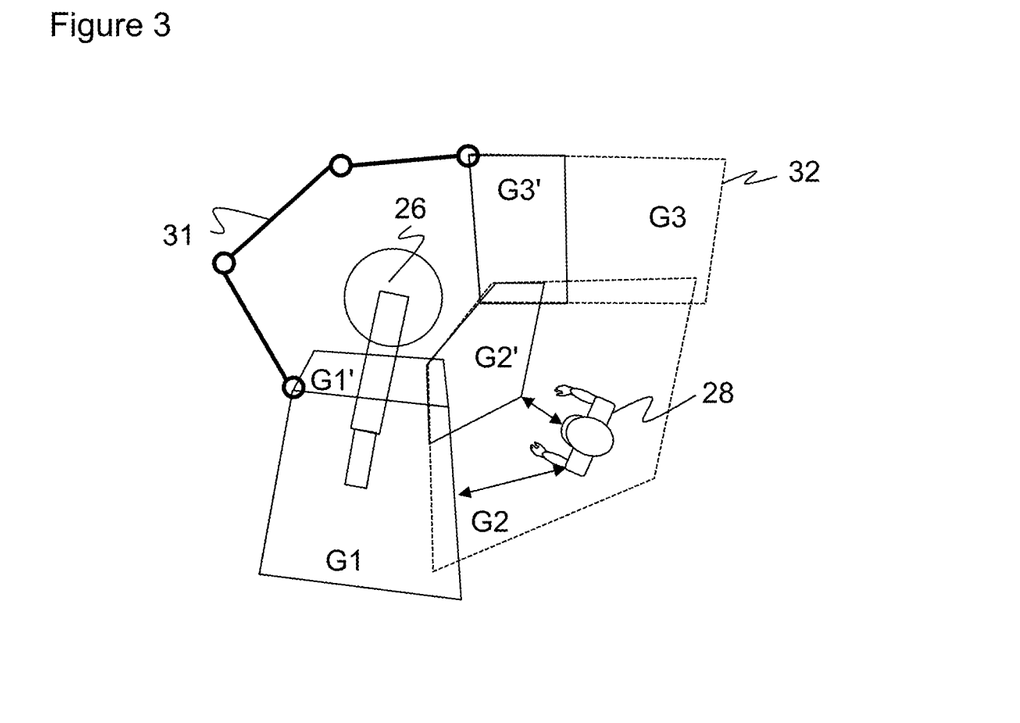
FIG. 3 a plan view similar to FIG. 2 with a person who currently prevents the switchover of hazard zones.

FIG. 3 shows a situation similar to FIG. 2 in which, however, the robot has now ended its work at the first work station in the hazard zone G1 and would want to move into the second work station in hazard zone G3. The hazard zones G2 and G3 would have to be activated for this purpose. This is, however, not possible because an object 28, namely a worker, is in the hazard zone G2. The worker may currently by all means be present there; the distances from the currently still active hazard zones G1, G2' are large enough. However, it is necessary to wait for a switchover until the worker has left the hazard zone G2 and naturally equally the hazard zone G3. For this purpose, the check whether the new hazard zones G2, G3 to be activated are free of objects can be constantly repeated, optionally in association with a warning to leave the environment, the hazard zones G2, G3. It is also conceivable that an alternative program is stored. If the primarily provided switchover is not possible for a workstep, an alternative workstep is carried out. Hazard zones 32 are also preconfigured for this purpose before whose activation a check for freedom from objects has to be made.

The actual monitoring within a workstep after a successful activation of the associated hazard zones 32 has already been explained above. The 3D sensor 10 determines the minimal distance of the respective next object 28 from the active hazard zones 32 and transmit it to a connected control, in particular to the control of the machine 26. An optimum and safe system reaction is generated there on the basis of these distance data, either the continued operation at full process speed, the reduction of the speed, a warning to the operator, or a safe stop of the machine.

Figure 4:
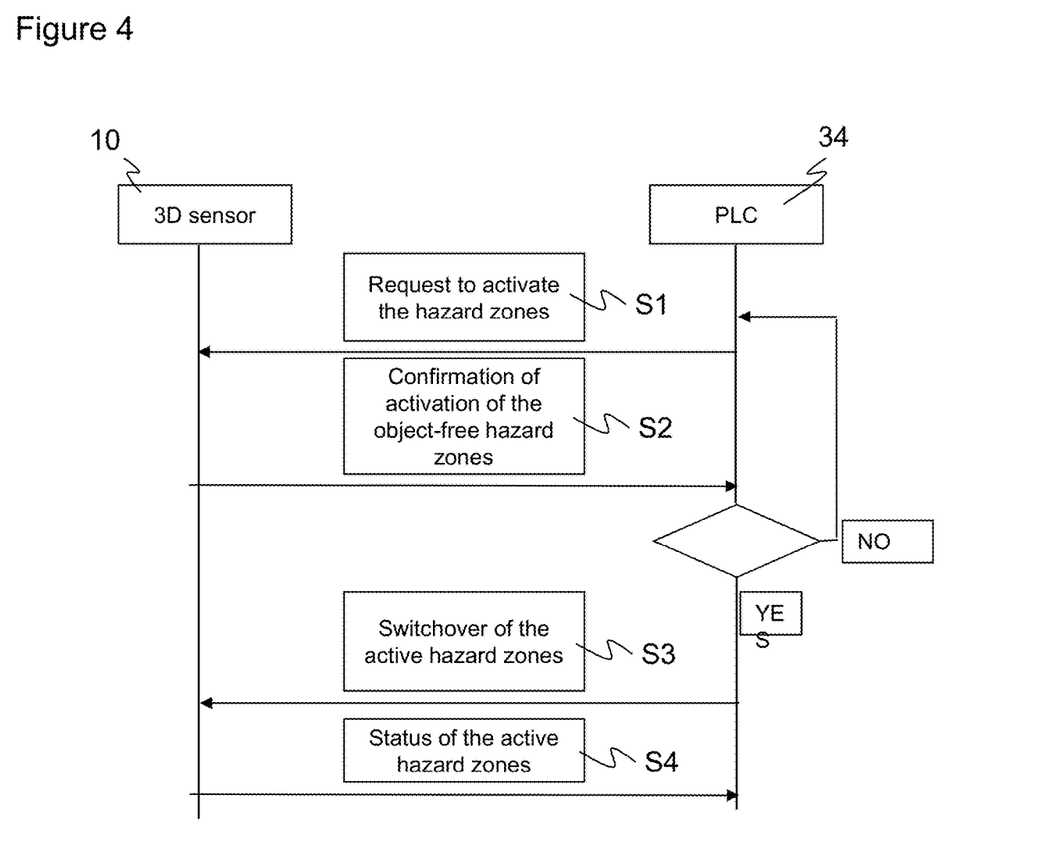
FIG. 4 an exemplary flowchart for switching over hazard zones.

FIG. 4 shows an exemplary flowchart between the 3D sensor 10 and the connected control 34 for a switchover of hazard zones 32. A corresponding routine takes place with a plurality of 3D sensors 10 if a sensor association is used. This routine preferably only relates to the activation of hazard zones as this is the critical part of a switchover. A deactivation of hazard zones 32 no longer required can take place at any point in time without further work since the region that has become free with respect to the still active hazard zones 32 is immediately additionally monitored for objects 28. The machine 26 should, however, sensibly have left the region to be deactivated to preclude it now being treated as a person by the object detection.

In a step S1, the control 34 queries an activation of the new hazard zones 32 at the 3D sensor 10. If the hazard zones 32 are secured by a sensor association having a plurality of 3D sensor, the routine takes place in parallel for all the 3D sensors.

The associated 3D sensors 10 each check whether the spatial region of the hazard zones 32 to be activated is free of objects and confirm this to the control 34 in a step S2. If an object is present in the region of the new hazard zones 32, the 3D sensor 10 does not confirm or outputs a corresponding feedback. The process is then interrupted and the query is repeated.

If all the connected 3D sensors 10 have confirmed the freedom from objects, the control 34 now transmits the switchover in a step S3. At the sensor side, the switchover only takes place when it takes place in a limited time window and matches the previous query in step S1, that is in particular relates to the same hazard zones 32 to be activated.

In a step S4, the 3D sensor 10 confirms the switchover to the control 34. The status fed back can also signal a failure of the switchover, for instance because the desired switchover does not correspond to the prior query.

Such a two-stage sequence of the switchover is in particular important for a sensor association having a plurality of 3D sensors and no individual 3D sensor has complete view of a hazard zone 32 to be activated. A parallel switchover of all the 3D sensors only takes place after a coordinated confirmation of the freedom from objects. The principle is also conceivable when different sensors and not only 3D sensors are integrated in the sensor association.

Alternatively to a two-stage switchover, the hazard zones 32 can in particular be switched over with immediate effect with a single 3D sensor 10. If then an object 28 is detected on the attempted switchover in the 3D sensor 10, the hazard zones 32 fall back into the state of inactive and this is reported back to the control analogously to step S4 via the status of the hazard zones 32.

The check for freedom from objects will now be looked at for an example a little more precisely with reference to FIGS. 5a-b, 6, and 7. It is above all a question of two points here. On the one hand, regions of a hazard zone 32' to be activated that overlap with an already active hazard zone 32 are preferably not checked for a presence of objects, but only the exclusive remaining region of the hazard zone 32' to be activated without the overlap region is checked. On the other hand, the switchover from hazard zones requires a process time, in particular in accordance with FIG. 4 between the feedback in step S2 and the actual switchover after step S3. So that an object 28 that is very close to the hazard zone 32' to be activated does not disappear unnoticed in this process time, the hazard zones 32' to be activated are expanded by an internal tolerance zone for the check for freedom from objects.

Figure 5A:
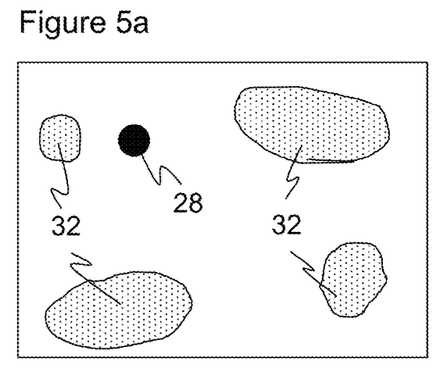
FIGS. 5a-b schematic representations of two exemplary configuration sets for hazard zones for two consecutive worksteps.
Figure 5B:
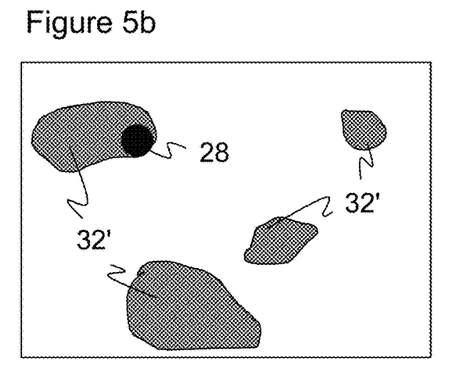

FIG. 5a shows very schematically in a light hatching the active hazard zones 32 in a plan view at a time t; FIG. 5b correspondingly in a dark hatching the active hazard zones 32' at a time t' after a switchover. The respective regions masked by the hazard zones 32 at the time t and by the hazard zones 32' at the time t' are marked by M and M' respectively. Without a check for freedom from objects, the object 28 would disappear after the switchover at the time t' in a hazard zone 32'.

Figure 6:
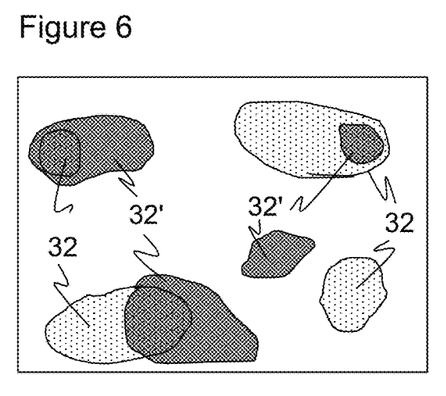
FIG. 6 a superposed representation of the hazard zones in accordance with FIGS. 5a-b.

FIG. 6 shows a combined view of the hazard zones 32, 32' at both times t, t'. It is preferably not the total new hazard zones 32' to be activated or the regions M' that are checked for freedom from objects, but rather only the portion that is added with respect to the already active hazard zones 32 or to the regions M, i.e. that does not overlap them, or Δ:=M'\M. Let furthermore Det be the set of detected object points; a check must then be made whether the intersection set Φ:=Δ∩Det is empty. The regions outside hazard zones 32, 32' and their overlapping regions M ∩M' can be ignored. This applies to the first region because this is checked in the next frame immediately after activation and to the second region because this can only include machine parts due to the definition of a hazard zone 32 and to its prior monitoring.

The check is implemented by means of binary maps in a preferred embodiment. For example, Det is a detection map, that is a two-dimensional binary field corresponding to the pixel of the 3D sensor 10, wherein just those positions are occupied by one where relevant objects 28 were detected and the remaining positions are occupied by zero. The hazard zones 32, 32' can be represented by respective mask maps that are occupied by ones at the position of the hazard zones 32, 32'. Intersection sets, residual sets, and the like can then be formed by simple element-like AND and OR operations. In a particularly simple embodiment, the fact is utilized that the respective current detection map is anyway already filtered by the active hazard zones 32, that is does not include any objects 28 in the regions M. It is therefore sufficient to link this detection map Det to the mask map M' for the new hazard zones 32' element-wise with AND and to check whether then any pixel remains set anywhere, i.e. a check is made whether the intersection set Φ':=M'∩Det is empty. Only the added residual regions M'\M are thereby implicitly checked due to the masking of the active hazard zones 32 in the object detection.

FIG. 7 again shows the combined regions M, M' of the active and of the new hazard zones 32, 32' to be activated in a superposed view. Unlike FIG. 6, an object 28 is here close to the region of a hazard zone 32' to be activated and moves toward it. There is the risk that such an object 28 disappears unnoticed during the switchover time in the hazard zone 32'.

Figure 7:
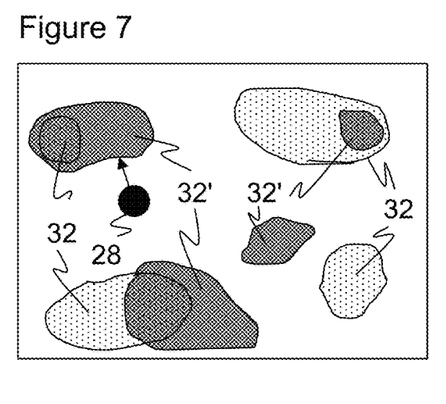
FIG. 7 a representation in accordance with FIG. 6 with an object close to a hazard zone to explain the consideration of the movement of objects during the switchover.

To avoid this, on the check for freedom of objects, the region M' of the hazard zones 32' to be activated is expanded by a tolerance that corresponds to a distance at most covered by an object 28 within the switchover time at an assumed maximum object speed. This expansion takes place radially outwardly in all directions under the assumption that an object 28 moves from any direction directly toward the hazard zone 32'. A typical highest human speed of 1.6 m/s is assumed as the speed, for example, in accordance with the safety standards named in the introduction. Alternatively to such worst-case scenarios satisfying the standard, the movement of objects 28 can be actively monitored to ensure that no object will reach a hazard zone 32' within the switchover time.

The switchover time corresponds to the sum of the known response times of the 3D sensor 10 and the control 34. As an arbitrary numerical example, let the switchover time be 100 ms, then at an object speed of at most 1.6 m/s, the tolerance buffer radially outwardly has to amount at most to 160 mm. In a real implementation, metric distances are preferably converted into pixels. The number of pixels per lateral metric resolution here depends on the distance from the 3D sensor 10, i.e. more pixels fit into a specific lateral metric distance, the closer it is to the 3D sensor 10. As an estimate to the bottom here, the shortest relevant distance of, for example, 1.5 m for an installation height of the 3D sensor of 3.5 m and a height of the detection region of 2 m above the ground can be assumed. This number of pixels very easily covers the tolerance region at a larger distance from the 3D sensor 10.

The expansion only takes place outside the already active hazard zones 32. For this purpose, for example, M' is first expanded by the tolerance buffer to N' and the residual set N'\M is then determined Otherwise the hazard zone 32 to be activated could be expanded into the already active hazard zones 32 that is not free of objects, but rather includes the machine 26. Analog to the statements with reference to FIG. 6, this is already taken into account in the current detection map in which the detected objects have already been filtered by the mask M of the active hazard zones 32. Consequently a check can be made element-wise whether N'∩Det is empty and all the discussed aspects of the overlap and of the tolerance buffer are thus taken into account.

It was assumed in the explanation of the previous embodiments that hazard zones 32 are statically preconfigured. As an alternative, hazard zones 32 can also be automatically determined dynamically at the running time from process parameters or from an exemplary routine of the process at the configuration time. For example, occupied regions of robots are modeled using 3D volumes. The required information originates from the robot control, from a description of the robot, or from a monitoring of the robot at the configuration time using the 3D sensor 10 or other sensors. The occupied region or occupied volumes modeled therefrom can be used as hazard zones 32 or can at least be used as the basis of a configuration.

The invention claimed is:

1. A method of securing at least one hazard zone of a hazardous machine, comprising:
   detecting objects in an environment of the at least one hazard zone from measured data of at least one 3D sensor, wherein a safety directed reaction of the machine takes place on an impending danger;
   generating an activation request on the at least one 3D sensor for switching over of hazard zones;

checking whether new hazard zones to be secured are free of objects;

reporting an object status on the new hazard zones; and performing a switchover to at least one of the new hazard zones to be secured during the operation of the machine, the at least one of the new hazard zones being free of objects.

2. The method in accordance with claim 1, wherein the 3D sensor determines the shortest distance between the hazard zone and objects and outputs the shortest distance to a control, the control deciding whether a safety directed reaction of the machine takes place with reference to the shortest distance.

3. The method in accordance with claim 1, wherein at least one previous hazard zone to be secured is deactivated on the switchover.

4. The method in accordance with claim 1, wherein objects in the hazard zone itself are ignored on the detection of objects by the 3D sensor.

5. The method in accordance with claim 4, wherein objects in a projective masked region of the hazard zone from a central perspective of the 3D sensor are also ignored.

6. The method in accordance with claim 1, wherein the check whether the new hazard zone to be secured is free of objects does not extend to an overlap region with previously secured hazard zones.

7. The method in accordance with claim 1, wherein the check whether the new hazard zone to be secured is free from objects includes a safety buffer around the new hazard zone to be secured, the safety buffer being determined from a required switchover time and a maximally adopted object speed.

8. The method in accordance with claim 1, wherein at least two configuration sets of hazard zones are specified for worksteps of the machine and a switchover is made one after the other to the hazard zones of the associated configuration set for the respective next workstep to be carried out.

9. The method in accordance with claim 1, wherein an alternative next workstep of the machine with other hazard zones to be secured follows if the new hazard zone to be secured is not free of objects.

10. A 3D sensor for monitoring an environment of at least one hazard zone comprising a hazardous machine, wherein the 3D sensor has at least one image sensor for detecting three-dimensional image data and a control and evaluation unit that is configured to detect objects in the environment of the at least one hazard zone with reference to the three-dimensional image data, wherein at least two configuration sets of hazard zones are stored in a memory of the 3D sensor and the control and evaluation unit is further configured to:

generate an activation request on the 3D sensor for switching over of the hazard zones;

check whether new hazard zones to be secured are free of objects;

report an object status on the new hazard zones; and perform a switchover to at least one of the new hazard zones to be secured, the at least one of the new hazard zones being free of objects.

11. The 3D sensor in accordance with claim 10, wherein the control and evaluation unit is further configured to generate a feedback whether the switchover is currently possible.

* * * * *